United States Patent

Shibata

[11] 4,414,742
[45] Nov. 15, 1983

[54] METHOD OF MAKING COMPOSITE ELECTRICAL CONTACT

[75] Inventor: Akira Shibata, Yokohama, Japan

[73] Assignee: Chugai Denki Kogyo K.K., Tokyo, Japan

[21] Appl. No.: 208,827

[22] Filed: Nov. 21, 1980

[30] Foreign Application Priority Data

Nov. 22, 1979 [JP] Japan .................. 54-150665

[51] Int. Cl.³ .......................... H01R 43/04
[52] U.S. Cl. ........................ 29/882; 29/876;
  10/27 R; 228/3.1; 228/115; 228/173 R
[58] Field of Search ............ 29/876, 881, 882;
  228/3.1, 115, 173 R, 175, 176; 200/267, 268, 269; 10/27 R

[56] References Cited

U.S. PATENT DOCUMENTS

| 3,151,385 | 10/1964 | Gwyn, Jr. | 29/882 |
| 3,191,276 | 6/1965 | Gwyn, Jr. | 29/882 |
| 3,341,943 | 9/1967 | Gwyn, Jr. | 200/267 X |
| 3,397,454 | 8/1968 | Gwyn, Jr. | 228/115 X |
| 3,600,794 | 8/1971 | Shibata . | |
| 3,634,934 | 1/1972 | Fitzgerald | 228/3.1 |
| 4,073,425 | 2/1978 | Bollian . | |

FOREIGN PATENT DOCUMENTS

1135272 8/1962 Fed. Rep. of Germany ..... 10/27 R
1092649 11/1967 United Kingdom .

Primary Examiner—Mark Rosenbaum
Assistant Examiner—Carl J. Arbes
Attorney, Agent, or Firm—Shlesinger, Fitzsimmons & Shlesinger

[57] ABSTRACT

Two or more pieces of wire of precious and non-precious metals are cold welded at their free ends, for producing a composite electrical contact or contact material, contact surface of which is made of said precious metal or alloys thereof. One of, a plurality of, or all of said free ends are provided with one or more projections of a diameter less than that of the wires which are expanded and flow under welding pressure over the abutting surfaces of the free ends to form bonded surfaces of wires without undesired or unexpected expansion of the wire pieces in their diameters.

4 Claims, 34 Drawing Figures

METHOD OF MAKING COMPOSITE ELECTRICAL CONTACT

This invention relates to a novel method for manufacturing a composite electrical contact by cold welding, and it relates to also composite electrical contacts or contact materials obtained therby.

It is known to obtain, by a cold welding process and by its succeeding shaping when needed, composite electrical contacts, viz., bimetallic or trimetallic contacts, base material or shank portion of which is made from non-precious metals such as copper and alloys thereof, and contact surface or contact portion of which is made from precious metals such as silver and silver alloys and is provided to one end or both ends of said shank portion. In this process which is disclosed for example in this inventor's U.S. Pat. No. 3,460,735 and No. 3,600,794, actively sheared end surfaces of a short wire material as the shank portion and of other short wire materials as the contact portion which are to be cold welded, are abutted to each other and subjected under pressure of their axial direction so as to form, by their plastic deformation, expanded portions about their abutting surfaces and to be welded thereby.

Conventional manufacturing methods of composite electrical contacts such as briefly explained above have following drawbacks.

Figure 1A:
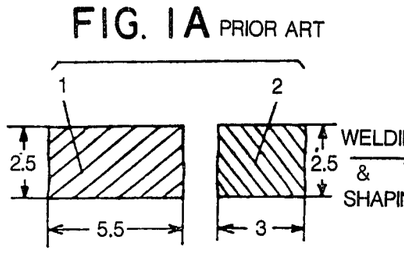
FIGS. 1A, 1B, 2A, 2B and 4A, 4B are schematic views showing the cold welding of composite electrical contacts in accordance with conventional methods.
Figure 1B:
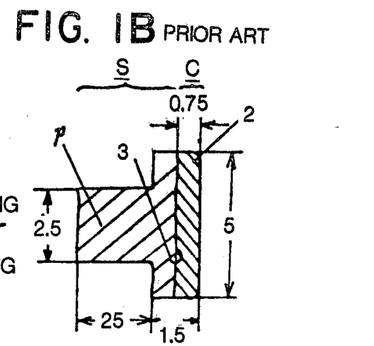
Figure 2A:
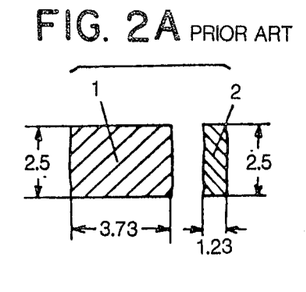
Figure 2B:
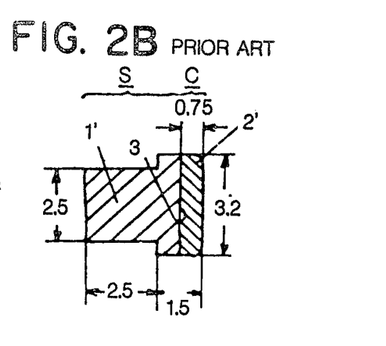

A: Unless expanded portions, diameters of which are larger than the diameters of the employed short wire materials are made about their corresponding abutting surfaces, force sufficient enough for binding said abutting surfaces can hardly be obtained. Experience the present inventor has and the experiments he has made show that said binding force is obtainable only when the diameter of said expanded portions or beads are preferably two times of those of the corresponding short wires or at least 1.5 times of them. When the beads have a diameter of less than 1.5 times of said short wires, bonded surfaces are weak and can hardly stand on practical use as electrical contacts. These facts are shown in FIGS. 1A, 1B, 2A and 2B. To wit, as illustrated in FIGS. 1A and 1B, numerical values in which and throught the drawing are in millimeters, a bimetallic electrical contact of the rivet type has generally a contact portion 2' of a diameter of more than two times of the diameter of a shank portion 1' or short wire material 1. And, only when they are under such comparative ratio, their bonded surface 3 formed between the copper shank portion 1' and the silver contact portion 2' can have an efficient binding force, viz., about 235 Kg or 12 Kg/mm² at its shearing force. This means that the diametrical ratio between the diameter of the contact material 2' of contact portion C and that of the shank portion 1' or shank material 1 is 2:1, and when said diametrical ratio is made smaller than the above value, it is impossible to afford an efficient shearing force or stress to their binded surface 3. For example, when a bimetallic electrical contact is made as illustrated in FIGS. 1A and 1B but to have its diametrical ratio between the contact portion 1' and the shank portion 2' as 1.3:1 or to have its contact portion C comparatively smaller than the shank portion S, the binding force between said two portions is only about 24 Kg or 3 Kg/mm² at its shearing force, and can not stand on the practical use. It is known, therefore, that for making a composite electrical contact having a practically acceptable bonded surface, the ratio between the diameter of a short wire material 1 which forms the shank 1' as well as a part of the contact portion C, and the finally obtained diameter of a short silver wire 2' has to be preferably 1:2 or at least 1:1.5.

Whereas, in this invention, as explained more in detail hereinunder, the diameter of the contact portion can freely selected irrespectively of the diameter of short cut wire material for a shank portion. In conventional methods also such as disclosed in U.S. Pat. No. 4,073,425, particularly at page 1 thereof, and lines 16 to 25, it is possible to reduce the diameter of contact portion by cutting it off circumferentially. But, these conventional methods can not bare comparison with this invention, because of loss of precious materials and because of complexity of steps and processes in the former methods.

Figure 4A:
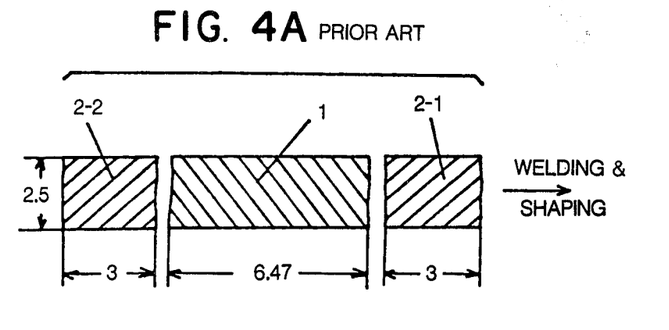
Figure 4B:
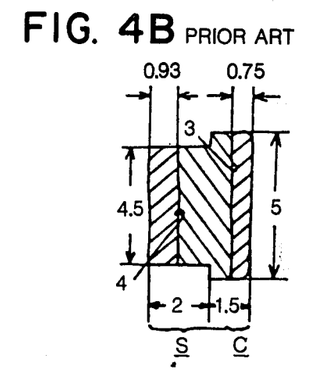

B: While a bimetallic composite electrical contact made by conventional methods comes to have, as aforementioned in the above paragraph A, a contact portion, the diameter of which is about two times of that of shank portion, a trimetallic or double-contact rivet made by conventional methods comes to have inevitably, as illustrated in FIGS. 4A and 4B such shank which is thicker and shorter than its contact portion. To wit, with reference to FIGS. 4A and 4B when a double-contact rivet is made from a silver wire material 2-2, copper wire material 1, and another silver wire material 2-1 respectively of the diameters same to the cut wires 1 and 2 of FIGS. 1A and 1B so as to have its contact portion C, diameter of which is same to that of FIGS. 1A and 1B and so as to afford the bonded surfaces 4 and 3 shearing forces sufficient enough to their practical use, its configurations and dimensions become inevitably as indicated in FIGS. 4A and 4B. The binding force at the surfaces 4 and 3 are respectively about 15 Kg (10 Kg/20 mm²) and about 235 Kg (12 Kg/mm²).

Thus, when FIGS. 1A and 1B and FIGS. 4A and 4B are compared, it shall be found that conventional cold welding methods can produce bimetallic composite contacts of only such configuration in which diameters of its contact portion and shank portion are under a limited ratio, and also that a trimetallic or double-contact rivet having a contact and shank portion of such diameters which are correspondent to those of a specific bimetallic composite contact can not be produced by the conventional methods. This is very troublesome for employing them to electrical applicances for example. There are many occasions that bimetallic or sigle-contact rivets and trimetallic or double-contact rivets are fitted to a same chassis via holes provied thereto. In this instance, as single-contact and double-contact rivets which are made by conventional cold welding methods can hardly have contact and shank portions which are equivalent to each other in their diameters, there have arisen uninvited many requirements in the designing and manufacturing of them, such as lack of unity of holes provied to the chassises.

Whereas, by this invention in which the diameter of contact portion and the diameter of shank portion of bimetallic as well as trimetallic composite electrical contacts can be selected freely as explained in the aforementioned paragraph A, the above drawbacks are readily solved.

Figure 7A:
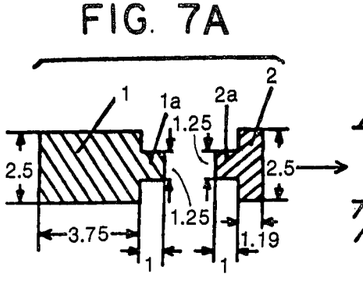
Figure 7B:
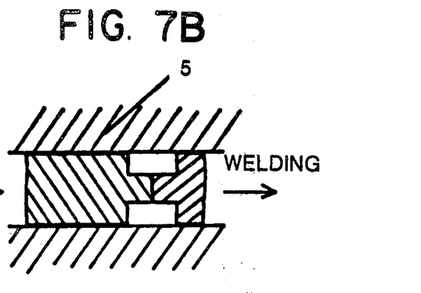
Figure 7C:
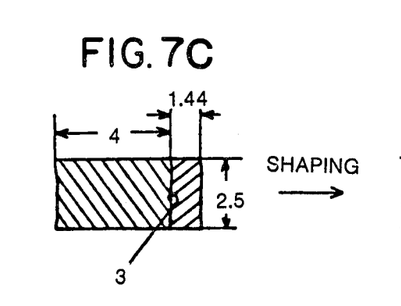
Figure 7D:
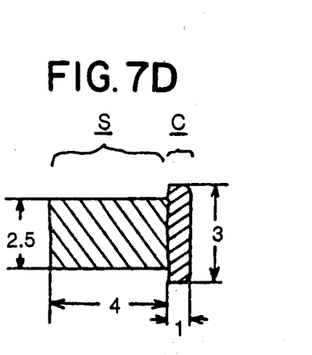

C: As mentioned above repeatedly, in conventional cold welding methods, the expansion of materials for shank and contact portions have to be made about their abutting surfaces at about two times of their original diameters for securing high binding force between them. This means that their contact portion C is made of a partial expansion of copper shank material and of expansion of silver contact material. In other words, said contact portion as illustrated in FIGS. 1A and 1B has always consisted of expanded copper and silver. Whereas, in this invention, said contact portion C can be, as illustrated in FIGS. 7A-7C solely of silver. This makes not only the reduction of consumption of silver, but also the reduction of height of the contact portion C, whereby the contact can be made economically as well as compact.

D: Conventional welding methods which require at least 1.5 times of expansion of wire materials in their diameter, need a room necessary to allow them for such expansion. In order to achieve this, the wire materials have to be placed within a free room at their abutting ends and portions adjacent therto, and subjected to force exerted along their axial directions. This often invites the sliding and slipping of the abutting ends at their contact surfaces, whereby their firm binding is lost. This tendency becomes larger when short wire materials are small in diameter.

Whereas, in this invention in which cold welding is made without the diametrical expansion of wire materials per se, the wire materials in whole and including their free ends may be contained in a cavity of a diameter same to those of the wire materials, whereby the sliding or slipping and bending of their contacting surfaces and their adjoining portions are prevented. In addition to this noticeable advantage, as the abutting surfaces of wire materials which are to be cold welded are smaller than the diameter of cut wire materials, as explained in detail hereinunder, in this invention, the force applied to said wire materials along their axial directions are effectively concentrated to the abutting surfaces for producing excellent binding forces thereabout.

The present novel method for manufacturing composite electrical contacts by cold welding is thus very advantageous compared to conventional methods, and can produce those contacts, configuration or diametrical rates of which are not producible before this invention.

In the following, preferred examples of this invention and described with reference to the accompanying drawing, while its working principle is as follows.

In the accompanying drawing;

FIGS. 3A-3D, 5A-5C, 6A-6D, 7A-7C, 8A-8C, and 9 are also schematic views showing the cold welding of various shapes of composite electrical contact in accordance with this invention.

This invention method comprises providing either one of, a plurality of, or all of the free ends of wire materials which are to be cold welded, with one or more projections which are smaller in diameter than the diameter of said ends, locating, within a cavity or cavities of diameter correspondent to one or all of diameters of said wire materials, one or all of said wire materials in whole or in part, and subjecting said wire materials to force along their axial directions for expanding the projections and thereby binding the wire materials at their abutting surfaces.

Each projections shall produce good binding force, if it can expand about 1.5 times of its original diameter or cross-sectional or surface area when subjected to force, and if it can expand over a binding surface area when the projection is provided in single. It shall be noted also that projections provided on free ends of cut short wires shall not necessarily be same as to each other in their configurations and volumes, but they have to be abutted to each other.

Besides FIGS. 1A to 9, other examples of projections to be made to a free end of cut wire piece in accordance with this invention are illustrated in FIGS. 10 to 16.

These projections, viz., those illustrated in the accompanying drawing can be made at their free ends by different methods such as cutting, stamping, forging, extrusion pressing, rolling and so on. However, in view of saving of raw materials, expecially of precious metals, the methods other than cutting-off would be preferable. And, when raw wire materials are small in diameter, projections for such small diametered wires can be made by expanding the parts of wire other than the part to be made as a projection. This formation is, off course, within the scope of this invention. Though the projections employable in this invention thus include various shapes and volumes, it might be the easiest way for designing and for production to make the projections which are formed on different wire pieces and which are to be pressed and expanded to make binded surfaces, equal to each other in their diameter and height, viz., dimensions which are one half of the diameter of employed wire materials.

EXAMPLE 1

(The production of a bimetallic or single-contact material or rivet having a contact portion, diameter of which is about 1 to 1.5 times of the diameter of shank portion):

A bimetallic or single-contact electrical contact material of the dimensions as illustrated in FIGS. 3A-3D (in which the diameter of contact surface 2' and that of shank portion 1' as cold welded are equal, viz., 1:1), and the rivet produced therefrom by shaping it after cold welding (the diametrical ratio between the contact portion C and the shank portion S is 1:1.3) are not producible by conventional methods, as explained in the above with reference to FIGS. 1A, 1B, 2A and 2B.

With reference to FIGS. 3A-3D, to a sheared or free end of a short copper wire material 1 having the dimensions as indicated in the drawing, there is formed a projection 1a of the illustrated dimensions, while to the free end of silver piece 2 which confronts to the projection 1a, there is also provided a projection 2a. These wire pieces 1 and 2 are then put into a die 5 having a cavity of the diameter of 2.5 mm, so that their projections 1a and 2a abut against each other at their forward surfaces. Then, the wires are forced along their axial directions until the projections are sufficiently expanded and fulfill the vacant room of the cavity. The composite electrical contact thus obtained is consisted of a shank piece 1' and a contact piece 2' of the equal diameter, and has its binded surface 3 of shearing force of about 59 Kg (12 Kg/mm$^2$). The contact piece 2' is then shaped in a manner known to the art. Though the single-contact rivet thus obtained is same to the one obtained in FIGS. 2A, 2B in their dimensions, the bonded surface 3 of the former is about 96 kg (12 Kg/mm$^2$) which is far superior to about 24 Kg (3 Kg/mm$^2$) and comparable to that of FIGS. 1A, 1B.

EXAMPLE 2

Figure 5A:
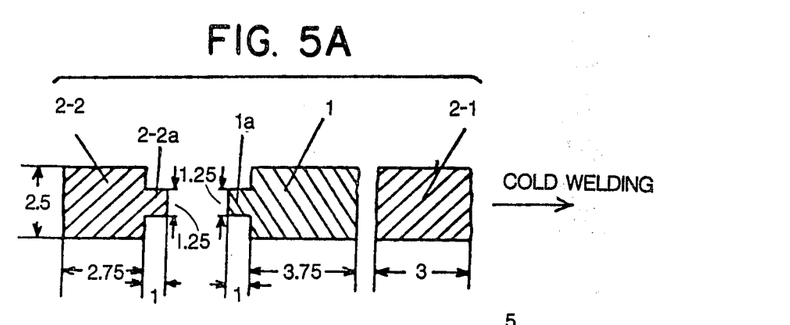
Figure 5B:
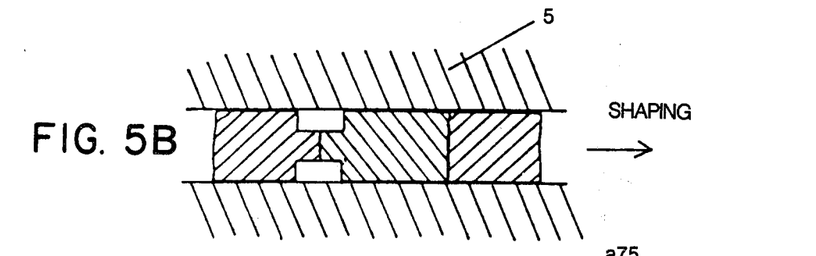
Figure 5C:
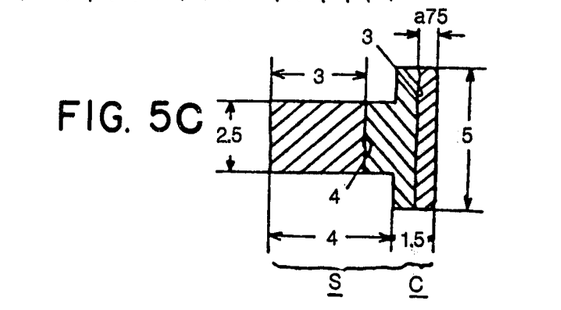
Figure 6A:
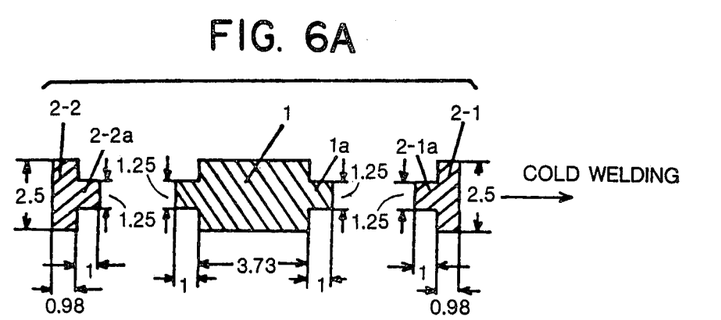
Figure 6B:
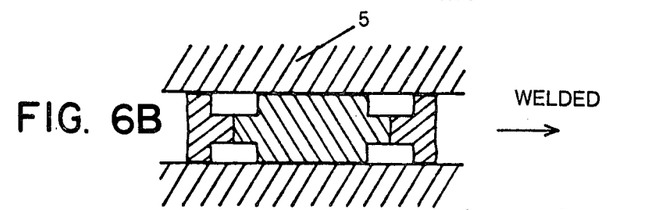
Figure 6C:
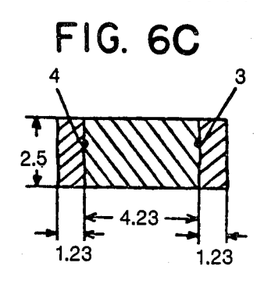
Figure 6D:
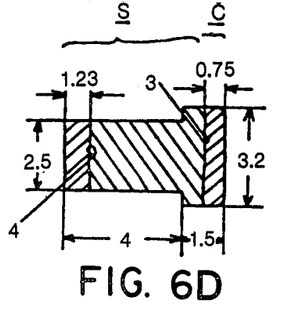

(A double-contact rivet having a shank portion, diameter of which is smaller than a contact portion and length of which is longer, compared to those which are producible by conventional methods, and another double-contact rivet having a shank portion, diameter of which is smaller and length of which is longer than those which are obtainable by conventional methods and also having a contact portion, diameter of which is smaller than the conventional ones):

The production of the former rivet is illustrated in FIGS. 5A-5C, while the latter rivet is illustrated in FIGS. 6A-6D. Both the former and the latter have such configurations and dimensions which are not attainable by conventional methods if their bonded surfaces are not neglected. In FIGS. 5A-5C and 6A-6D, those parts which are identical to those of FIGS. 4A, 4B, are represented by same numerals. Their processes of cold welding and shaping are the same as explained with reference to FIGS. 3A-3D. In FIGS. 5A-5C, however, the binding between the wire 1 and the other wire 2-1 shall not necessarily be made within a die cavity 5, as said binding is made as preliminary binding.

The binding force of the bonded surface 3 in FIGS. 5A-5C is, when expressed by shearing force, about 235 Kg (12 Kg/mm$^2$), that of the binded surface 4 in the same FIGS. 5A-5C about 59 Kg (12 Kg/mm$^2$), while that of the bonded surface 3 in FIGS. 6A-6D is about 96 Kg (12 Kg/mm$^2$) and that of the bonded surface 4 in FIGS. 6A-6D about 59 Kg (12 Kg/mm$^2$).

EXAMPLE 3

Figure 3A:
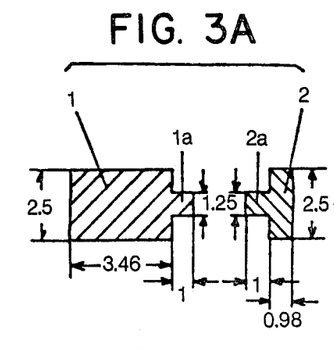
Figure 3B:
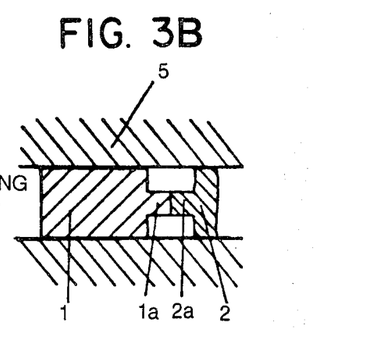
Figure 3C:
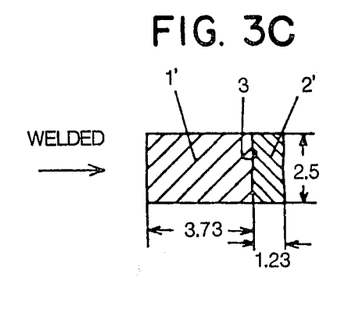
Figure 3D:
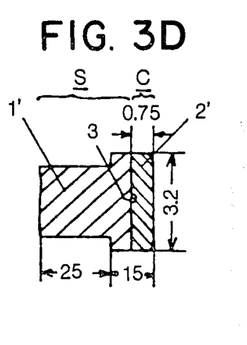

(Bimetallic or single-contact rivet having a contact portion solely made from desired precious metals, which are not producible by conventional methods):

As repeatedly described and explained in the above, conventional cold welding methods require the diametrical expansion of wire materials to about two times of their original diameters along their welding surfaces in order to have sufficient binding force. And, this requirement inevitably produces the expansion or bead which is consisted of both wire materials. Whereas, in this invention as illustrated in FIGS. 7A-7C, no such bead is produced, and the contact portion can be made solely from silver. Numerals identical to those in FIGS. 3A-3D are used in this FIGS. 7A-7C, too. The shaping process itself is conventional.

EXAMPLE 4

Figure 8A:
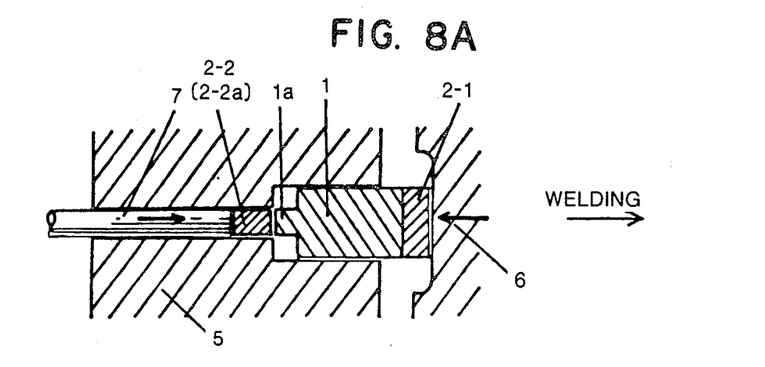
Figure 8B:
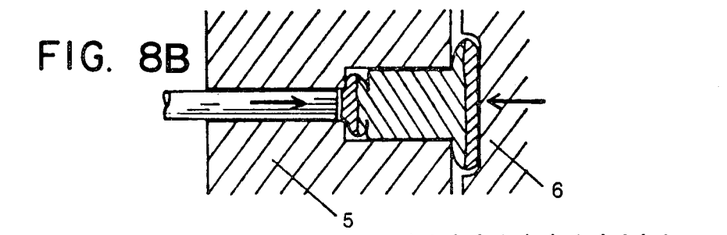
Figure 8C:
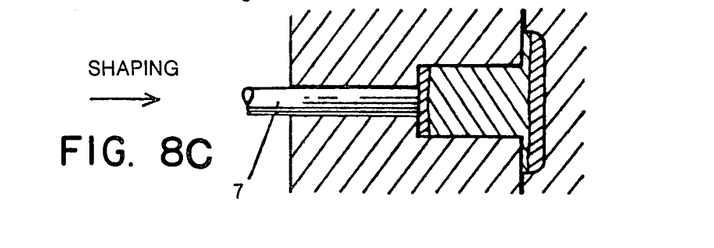

This example which is shown in FIGS. 8A-8C is essentially similar to the one explained in the foregoing with reference to FIGS. 3A-3D. There is a difference, however, in that either one of short wires 1 or 2 which is to be cold welded, can not be provided with a projection 1a or 2a, because of its volume being too small. The projection 1a provided to the short wire 1 and another short wire 2 have configurations, dimensions, and functions which are same to those 1a and 2a which are explained in FIGS. 3A-3D. The parts in this FIGS. 8A-8C which are correspondent to those of FIGS. 3A-3D are represented by same numerals. Numeral 6 is a punch, and numeral 7 a pin. Manufacturing steps of this example is same to those which are described with reference to FIGS. 3A-3D.

Figure 9:
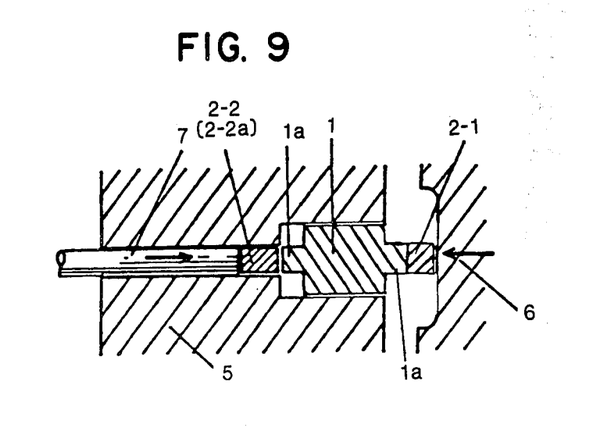
Figure 10A:
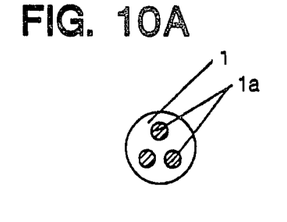
FIGS. 10A, 10B, 11A, 11B, 12, 13, 14, 15 and 16 show other examples of projections provided to free ends of short wire materials.
Figure 10B:
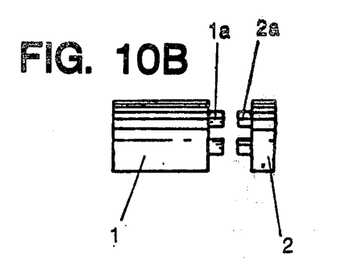
Figure 11A:
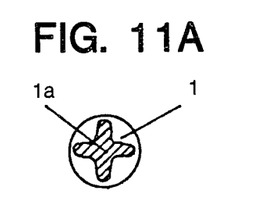
Figure 11B:
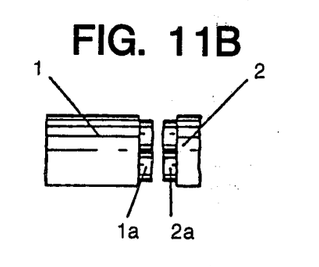
Figure 12:
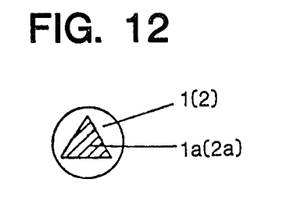
Figure 13:
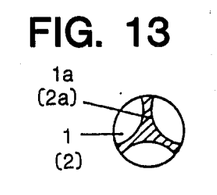
Figure 14:
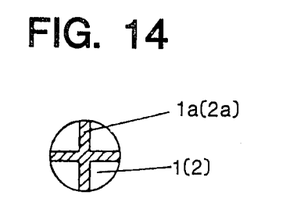
Figure 15:
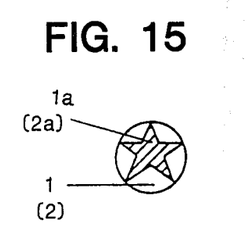
Figure 16:
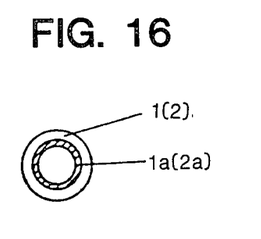

FIG. 9 shows another combination of short wires, with which this example 4 may start.

What is claimed is:

1. A method of making a composite electrical contact from a plurality of cut wires, including wires of different materials, by cold welding: which comprises providing at least one end of one of said wires of a first material with at least one projection which is smaller in diameter than the diameter of said one end of said one wire, locating said one end of said one wire and said projection within a die cavity having a diameter which corresponds to the diameter of said one end of said one wire, and with said projection abutting one end of another wire of a second material, and subjecting said wires to force along their axial directions to expand the projection outwardly over the abutting surfaces and thereby binding said surfaces together along an interface lying in a plane extending transversely of the axes of said wires.

2. A method as defined in claim 1, wherein said step of subjecting said wires to force along their axial directions includes expanding said projection until the ratio of the diameter of said one wire to the diameter of said other wire is in the range of 1:1 to less than 1:1.5.

3. A method as defined in claim 1, wherein said other wire has on said one end thereof a projection positioned in said cavity in abutting relation to said projection on said one wire, whereby both said projections are expanded simultaneously during application of said force to said wires.

4. A method as defined in claim 3, wherein said projections are expanded to the diameter of said cavity during application of said pressure, and portions of the wires adjacent opposite sides of said bonded surfaces are thereafter shaped and expanded to a common diameter larger than the diameter of said cavity.

* * * * *